United States Patent [19]

Yutaka

[11] Patent Number: 5,213,029
[45] Date of Patent: May 25, 1993

[54] APPARATUS FOR TREATING FOOD UNDER HIGH PRESSURE

[75] Inventor: Hideki Yutaka, Kobe, Japan

[73] Assignee: Kabushiki Kaisha Kobe Seiko Sho, Kobe, Japan

[21] Appl. No.: 855,855

[22] Filed: Mar. 20, 1992

[30] Foreign Application Priority Data

Mar. 28, 1991 [JP] Japan .................. 3-64826
Nov. 27, 1991 [JP] Japan ................. 3-312746

[51] Int. Cl.⁵ .............................................. A23L 3/00
[52] U.S. Cl. ................................. 99/474; 62/341; 62/434; 99/467; 99/470; 99/484; 99/517; 100/93 P; 422/295
[58] Field of Search ............... 99/349, 351, 403, 408, 99/453, 467, 468, 470, 473–476, 483, 484, 485, 486, 516; 62/341, 434, 331; 100/93 RP, 93 P; 426/521, 524; 165/138, 58, 61; 422/295, 296; 126/373, 374

[56] References Cited

U.S. PATENT DOCUMENTS

| | | | |
|---|---|---|---|
| 4,111,654 | 9/1978 | Fahlvik et al. | 422/295 |
| 4,340,111 | 7/1982 | Skala | 165/61 |
| 4,410,030 | 10/1983 | Skala | 126/374 |
| 4,485,639 | 12/1984 | Sakamoto | 62/434 |
| 4,636,395 | 1/1987 | Robinson, Jr. et al. | 426/521 |
| 4,637,936 | 1/1987 | White et al. | 99/470 |
| 4,760,712 | 8/1988 | Hashimoto | 62/341 |
| 4,830,278 | 5/1989 | Kohmura et al. | 99/475 |
| 4,830,865 | 5/1989 | McFarlane et al. | 99/470 |
| 4,967,651 | 11/1990 | Hsieh et al. | 99/474 |
| 4,989,668 | 2/1991 | Shimizu | 99/470 |

FOREIGN PATENT DOCUMENTS

| | | | |
|---|---|---|---|
| 2433319 | 4/1990 | France | 62/434 |
| 63-82677 | 4/1988 | Japan . | |
| 289877 | 3/1990 | Japan . | |
| 2150264 | 6/1990 | Japan . | |
| 347058 | 2/1991 | Japan . | |
| 2226777 | 7/1990 | United Kingdom | 422/295 |

*Primary Examiner*—Timothy F. Simone
*Attorney, Agent, or Firm*—Oblon, Spivak, McClelland, Maier & Neustadt

[57] ABSTRACT

An apparatus for treating food under isostatic high pressure applied by a liquid pressure medium which comprises a high-pressure vessel forming therein a treating chamber in which food is placed, a pressure medium tank adjacent to said high-pressure vessel, pipes to deliver a pressure medium from said pressure medium tank to said treating chamber, and a cooling device to hold therein the high-pressure vessel and the pressure medium tank and to cool the high-pressure vessel and the pressure medium tank simultaneously.

8 Claims, 6 Drawing Sheets

APPARATUS FOR TREATING FOOD UNDER HIGH PRESSURE

BACKGROUND OF THE INVENTION

1. Field of the Invention

The present invention relates to an apparatus for treating a large amount of food for denaturation and sterilization under high pressure at low temperatures.

2. Description of the Prior Art

There have been active studies on the application of high pressure to food for denaturation, sterilization, and oxidation control. The denaturation of jam by high-pressure treatment has been put to practical use. In addition, the latest development is intended to enhance the effect by combining high pressure with high temperature or low temperature.

The existing high-pressure apparatus for production or research is of the piston type. It usually undergoes temperature control by the circulation of hot water or cooling medium around the high-pressure vessel.

When the treatment of food under high pressure comes into general use in the future, the apparatus of the piston type will be replaced by a new one which is designed such that the high-pressure vessel is supplied with a pressure medium by a pump from an external source as shown in FIG. 6. Referring to FIG. 6, there is shown a high-pressure vessel 20, which, in combination with top and bottom closures 21 and 22 fitted thereto, forms a high-pressure chamber (treating chamber) 23. An object 24 placed in the treating chamber 23 is pressed by a pressure medium introduced thereinto from a pressure medium tank 25 by a pump 26. During operation, the high-pressure vessel 20 is cooled externally by circulating a cooling medium from a cooling unit 28 through a jacket 27 attached to the periphery of the vessel 20. Incidentally, there are shown a pressure reducing valve 29 and a press frame 30.

The apparatus shown in FIG. 6, however, has a disadvantage of making it necessary to manage a large amount of thermal energy for temperature control. This disadvantage leads to a high production cost. In other words, cooling by a cooling medium is poor in cooling performance and heat efficiency.

Moreover, the conventional apparatus presents the difficulty of controlling the temperature of pressure the medium. It also presents a difficulty that if the pressure medium tank is at normal temperature, the pressure medium introduced into the vessel prevents the cooling of the vessel.

SUMMARY OF THE INVENTION

It is an object of the present invention to provide an apparatus for treating food in commercial quantities under high pressure at low temperatures.

The apparatus of the present invention is made up of a high-pressure vessel forming a treating chamber therein, a pressure medium tank 5, and a pump to deliver the pressure medium under pressure to the treating chamber from the pressure medium tank, so that an object placed in the treating chamber experiences isostatic pressure by the pressure medium.

In the first aspect of the invention, the apparatus is characterized by that the high-pressure vessel and the pressure medium tank are arranged integrally side by side in a freezer to cool them.

In the second aspect of the invention, the apparatus is characterized by that the treating chamber in the high pressure vessel is defined by detachable closures and the axial force of which is supported by a press frame, within which the freezer is arranged.

In the third aspect of the invention, the apparatus is characterized by that the pump, the treating chamber, and the pressure medium tank are connected by pipes and a stop valve which are arranged in the freezer.

The feature of the present invention resides in that the high-pressure vessel and the pressure medium tank are in the freezer. This feature leads to efficient cooling, energy saving, and reduction of freezer volume.

DESCRIPTION OF THE PREFERRED EMBODIMENTS

Figure 1:
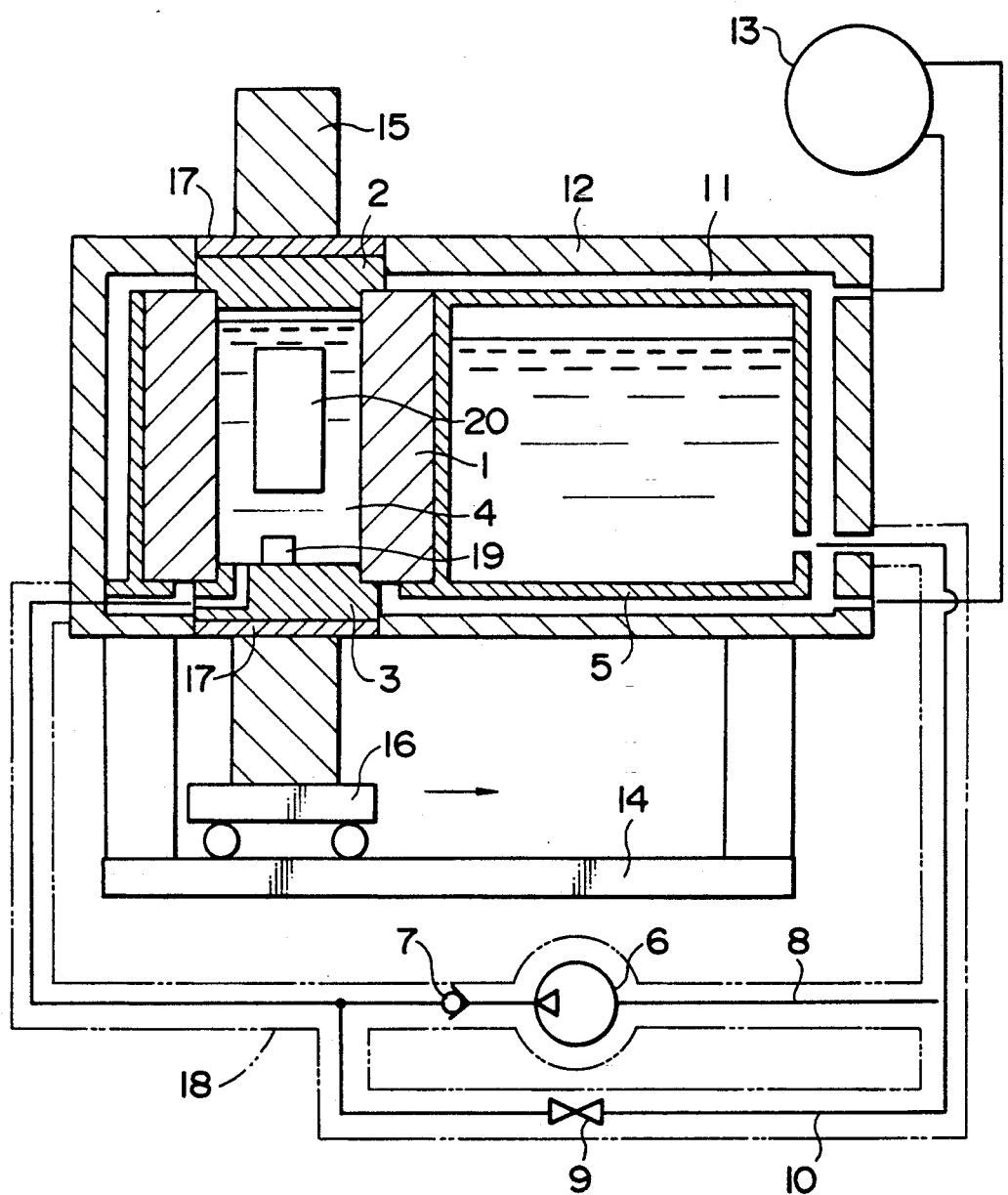
FIG. 1 is a sectional view showing the first embodiment of the invention.

The first embodiment shown in FIG. 1 has a cylindrical high-pressure vessel 1. It is provided with detachable top and bottom closures 2 and 3 which define the treating chamber 4 therebetween. They are fitted into the upper and lower openings of the high-pressure vessel 1, respectively, with a packing (not shown) interposed therebetween.

Adjoining the high-pressure vessel 1 is a pressure medium tank 5 containing a pressure medium. The pressure medium enters the treating chamber 4 through the bottom closure 3 as it is delivered under pressure by a high-pressure pump 6 through piping 8 having a check valve 7. It may be recycled to the pressure medium tank 5 through a valve 9 and a by-pass pipe 10.

The high-pressure vessel 1 and the pressure medium tank 5 are surrounded by the freezer 12, with a gap 11 interposed therebetween. The gap 11 permits the cooling medium (produced by a refrigeration unit 13) to circulate therein.

The freezer 12 is supported on a base frame 14. A carrier 16 supporting a press frame 15 runs on the base frame 14. The press frame 15 engages with the top and bottom closures 2 and 3 to bear the axial force exerted on them during pressing.

In other words, the press frame 15 engages with and disengages from the top and bottom closures 2 and 3. Within the press frame 15 is arranged the freezer 12. The press frame 15 is separated from the top and bottom closures 2 and 3 by a heat insulator 17 to prevent heat dissipation and frosting. The heat insulator 17 is made of a resin which is strong enough to withstand the axial force exerted to the press frame.

The pipes 8 and 10, pump, and valves are arranged outside the freezer 12 and are covered with a cold insulator 18 to prevent the temperature rise of the pressure medium. In FIG. 1, the reference numeral 19 denotes a temperature sensor such as thermocouple and the reference numeral 20 denotes an object to be treated, i.e., food such as meat, fish, and packed jelly and liquid.

Figure 2:
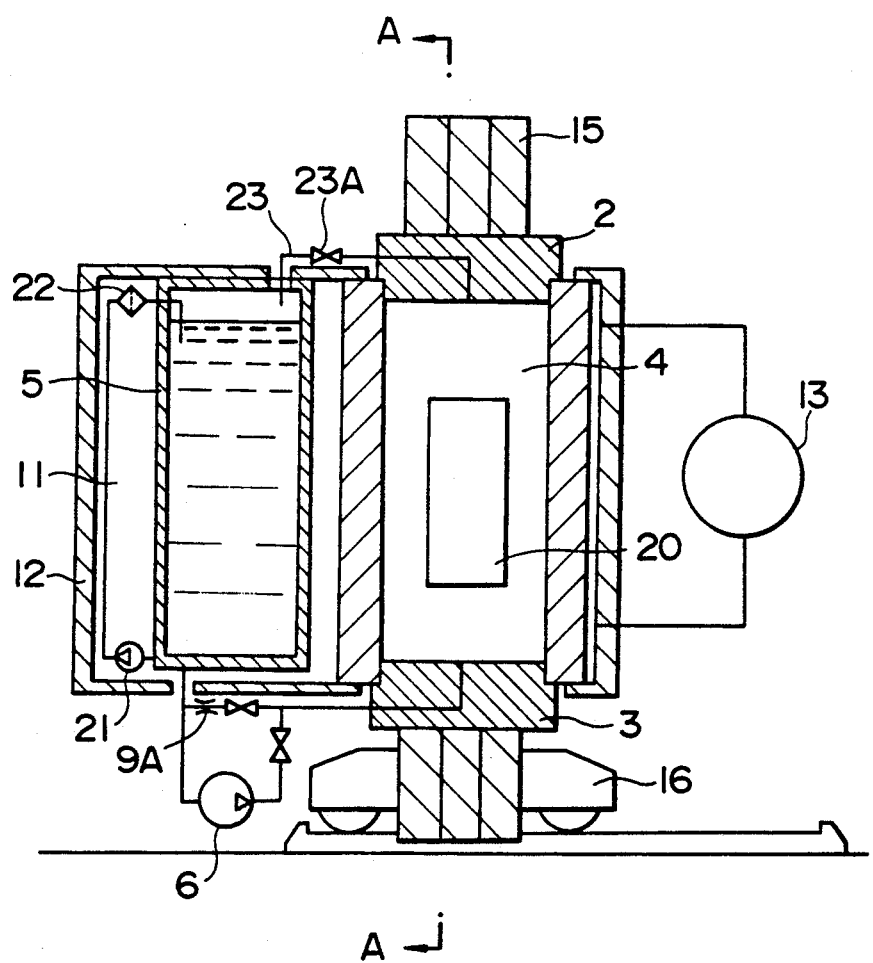
FIG. 2 is a sectional view showing the second embodiment of the invention.
Figure 3:
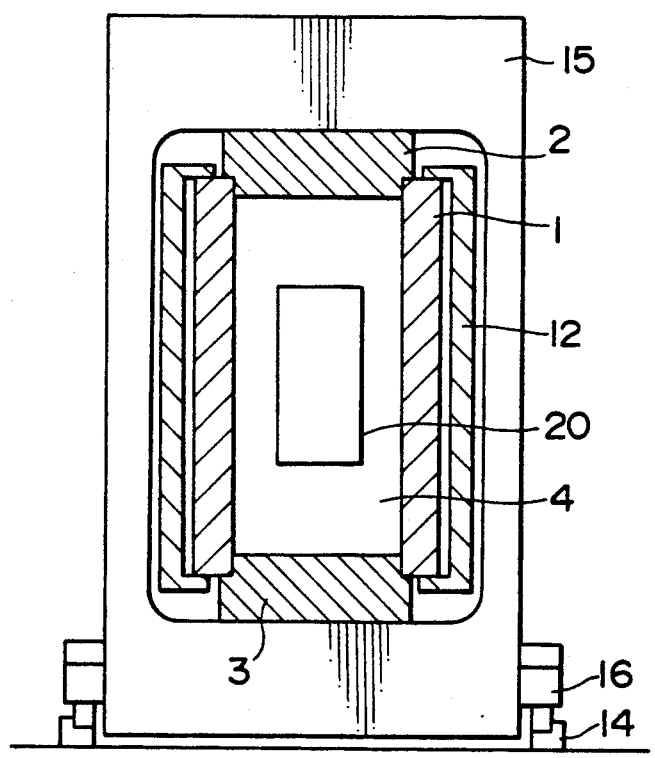
FIG. 3 is a sectional view taken along the line A—A in FIG. 2.

The second embodiment of the present invention is shown in FIGS. 2 and 3. It differs from the first one in that the piping 8 is provided with a throttle 9A, the pressure medium tank 5 is provided with a pump 21 and a membrane filter 22 to separate microorganisms from the pressure medium, and the top closure 2 is provided with a return pipe 23 having a stop valve 23A. The same or corresponding parts are identified by the same reference numerals in FIGS. 1 to 3.

The second embodiment is advantageous over the first one in that the pressure medium is kept clean, the piping 23 and stop valve 23A permit air to escape when the pressure medium is introduced into the treating chamber 4, and the piping 23 and stop valve 23A also permit the pressure medium to return rapidly to the pressure medium tank 5.

Figure 4:
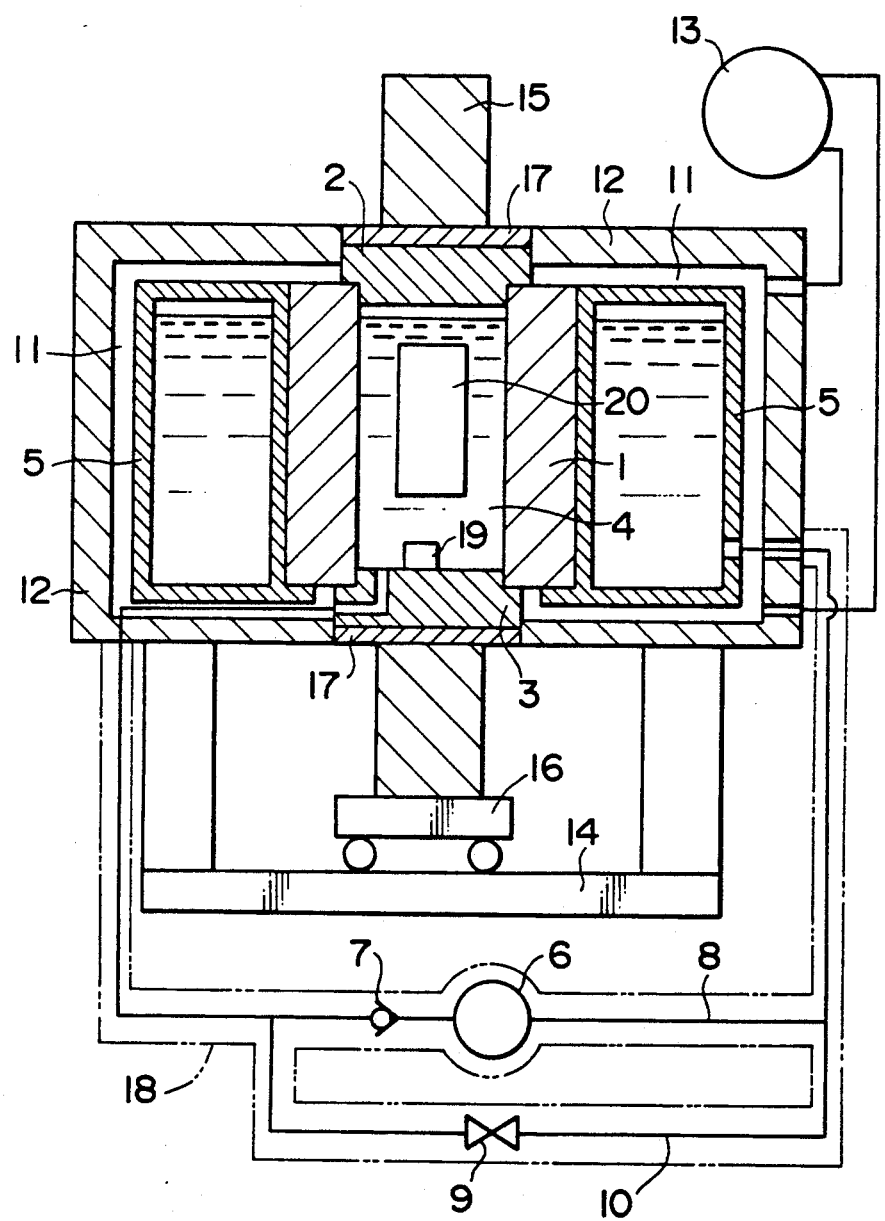
FIG. 4 is a sectional view showing the third embodiment of the invention.

The third embodiment of the present invention is shown in FIG. 4. It is identical with the first embodiment except that the high-pressure vessel 1 is surrounded by the pressure medium tank 5.

Figure 5:
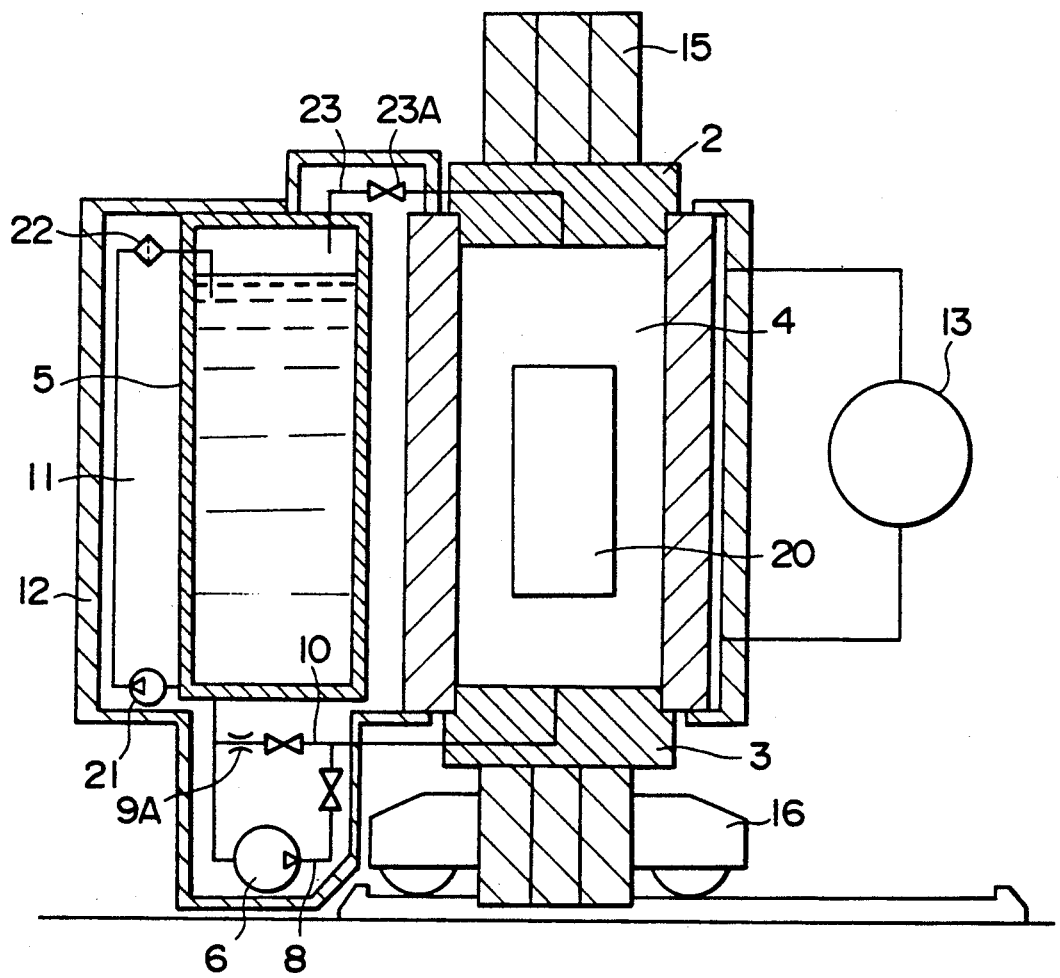
FIG. 5 is a sectional view showing the fourth embodiment of the invention.
Figure 6:
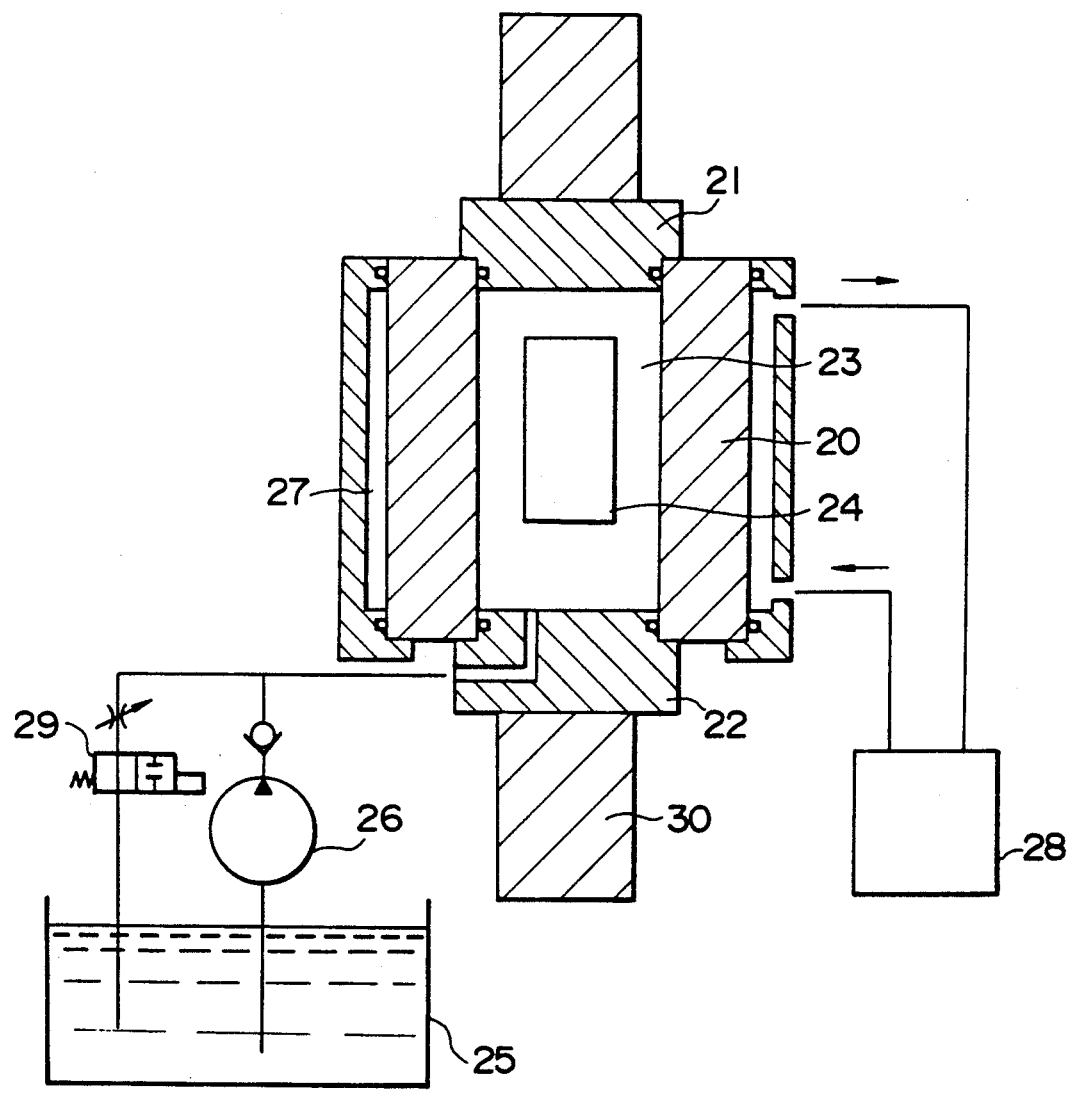
FIG. 6 is a sectional view showing a conventional apparatus.

The fourth embodiment of the present invention is shown in FIG. 5. It is characterized by that the piping system is entirely arranged inside the freezer 12. (The piping system includes the pump 6, the pipe connecting the pressure medium tank 5 and the treating chamber 4 in the high-pressure vessel 1, the pipe 8 having the check valve 7, the by-pass pipe having the throttle 9A, and the pipe 23 having the stop valve 23A.)

An advantage of the fourth embodiment is that the cold insulator 18 is not necessary and hence the heat insulation of the system can be simplified without a loss of thermal energy.

In the case where the fourth embodiment is operated by the pressure pump 6 of booster type driven by hydraulic oil, it is necessary as a matter of course that the hydraulic power unit (which generates heat) be placed outside the freezer 12 and at least that part of the booster which pressurizes the pressure medium be placed in the freezer 12.

In operation of the above-mentioned first to fourth embodiments of the present invention, the object 20 to be treated is placed in the treating chamber 4 cooled by the freezer 12 after it has previously been cooled outside, and then the cooled pressure medium is delivered under pressure from the pressure medium tank 5. Therefore, they permit the desired pressure treatment at low temperatures. The axial force exerted on the closures during pressure treatment is supported by the press frame 15. After the pressure treatment is complete, the pressure medium is depressurized, the press frame 15 is retracted, the top closure 2 is removed, and the treated object 20 is discharged.

As mentioned above, the apparatus of the present invention is constructed such that both the high-pressure vessel and pressure medium tank are cooled in the freezer. This construction reduces the cooling area and hence leads to energy saving. In addition, this construction reduces the distance between the high-pressure vessel and the pressure medium tank and hence reduces the energy loss that occurs in the piping when the pressure medium is delivered. Once cooled, the apparatus remains thermally stable because of its large heat capacity. Thus the present invention contributes to cost reduction and quality improvement in high-pressure treatment on a large scale.

What is claimed is:

1. An apparatus for treating food under isostatic high pressure applied by a liquid pressure medium, comprising:
   a high-pressure vessel forming therein a treating chamber in which food is placed,
   a pressure medium tank adjacent to said high-pressure vessel,
   means for delivering a pressure medium from said pressure medium tank to said treating chamber, and
   cooling means holding therein said high-pressure vessel and said pressure medium tank, whereby said high-pressure vessel and said pressure medium tank are simultaneously cooled.

2. An apparatus for high-pressure treatment as defined in claim 1, which further comprises detachable closures fitted to the upper and lower openings of said high-pressure vessel and a press frame which engages with said closures to support axial forces exerted on said closures.

3. An apparatus for high-pressure treatment as defined in claim 2, wherein said cooling means is also arranged within said press frame.

4. An apparatus for high-pressure treatment as defined in claim 2 or 3, which further comprises heat insulators of high-strength resin capable of withstanding an force of said press frame, each of said insulators being interposed between said press frame and each of said closures.

5. An apparatus for high-pressure treatment as defined in claim 1, wherein said cooling means is a freezer and is separated from said high-pressure vessel and said pressure medium tank by a gap, including refrigerator unit supplying a cooling medium to said gap.

6. An apparatus for high-pressure treatment as defined in claim 1, including pipes arranged inside said cooling means, and connecting said high pressure vessel to said pressure medium tank.

7. An apparatus for high-pressure treatment as defined in claim 1, including pipes arranged outside said cooling means and covered with a cold insulator, and connecting said high pressure vessel to said pressure medium tank.

8. An apparatus for high-pressure treatment as defined in claim 1, wherein said pressure medium tank includes a pump and a membrane filter to remove microorganisms from the pressure medium.

* * * * *